(12) United States Patent
Fuhrmann et al.

(10) Patent No.: US 12,545,464 B2
(45) Date of Patent: Feb. 10, 2026

(54) VARIO-TIP SYSTEM

(71) Applicant: WALDORF TECHNIK GmbH, Engen (DE)

(72) Inventors: Ralf Fuhrmann, Tengen/Weil (DE); Christian Boos, Gundelfingen (DE)

(73) Assignee: WALDORF TECHNIK GmbH, Engen (DE)

( * ) Notice: Subject to any disclaimer, the term of this patent is extended or adjusted under 35 U.S.C. 154(b) by 0 days.

(21) Appl. No.: 18/367,125

(22) Filed: Sep. 12, 2023

(65) Prior Publication Data

US 2024/0239542 A1 Jul. 18, 2024

(30) Foreign Application Priority Data

Sep. 13, 2022 (EP) .................................. 22195306

(51) Int. Cl.
*B65B 57/10* (2006.01)
*B29C 45/17* (2006.01)
*B29C 45/42* (2006.01)
*B29C 45/76* (2006.01)
*B65B 35/36* (2006.01)

(52) U.S. Cl.
CPC .......... *B65B 57/10* (2013.01); *B29C 45/4225* (2013.01); *B65B 35/36* (2013.01); *B29C 45/1769* (2013.01); *B29C 45/7686* (2013.01); *B29C 2945/76421* (2013.01)

(58) Field of Classification Search
CPC . B29C 45/42; B29C 45/4225; B29C 45/1769; B29C 45/7686; B29C 2045/7633; B29C 2945/76421; B29C 2945/76464; G01N 21/90; G01N 21/9081; B65B 57/10
See application file for complete search history.

(56) References Cited

U.S. PATENT DOCUMENTS

| | | | | | |
|---|---|---|---|---|---|
| 5,578,331 | A | * | 11/1996 | Martin | B29D 11/0024 264/2.6 |
| 5,934,859 | A | * | 8/1999 | Goetzelmann | B65G 47/907 414/416.08 |
| 5,980,184 | A | * | 11/1999 | Lust | B29D 11/00221 414/752.1 |
| 2005/0048159 | A1 | * | 3/2005 | Hirasawatsu | B29C 49/42101 425/528 |
| 2006/0269648 | A1 | * | 11/2006 | Drysdale | B29C 49/42101 425/537 |
| 2012/0124945 | A1 | * | 5/2012 | Boos | B65B 5/068 53/558 |

(Continued)

FOREIGN PATENT DOCUMENTS

| | | |
|---|---|---|
| DE | 102017118527 A1 | 2/2019 |
| EP | 2323930 B1 | 3/2012 |

(Continued)

*Primary Examiner* — Joshua G Kotis
(74) *Attorney, Agent, or Firm* — Bachman & LaPointe, P.C.

(57) ABSTRACT

The invention relates to a packaging method and to an associated packaging device (1) for packaging injection-molded plastic parts (2), which are pipette tips or medical reaction vessels, the injection-molded plastic parts (2) being arranged in cavity-pure subgroups (6) and then subjected to lateral inspection sub-subgroup (10) per sub-subgroup (10).

20 Claims, 6 Drawing Sheets

(56) References Cited

U.S. PATENT DOCUMENTS

| | | | |
|---|---|---|---|
| 2014/0331613 A1* | 11/2014 | Czizegg | B65B 35/38 53/448 |
| 2015/0076353 A1* | 3/2015 | Bathelet | G01B 11/06 250/340 |
| 2015/0146965 A1* | 5/2015 | Roman | G06T 7/73 382/141 |
| 2015/0314502 A1* | 11/2015 | Stoelben | B29C 45/162 425/500 |
| 2016/0244193 A1* | 8/2016 | Faltenbacher | B29C 45/4225 |
| 2016/0321796 A1* | 11/2016 | Dordoni | G01B 11/254 |
| 2017/0097305 A1* | 4/2017 | Prinz | G06T 7/0004 |
| 2017/0227472 A1* | 8/2017 | Colton | G01N 21/9081 |
| 2018/0136142 A1* | 5/2018 | Will | G01N 21/8806 |
| 2019/0047196 A1* | 2/2019 | Czizegg | B29C 45/1769 |
| 2022/0048236 A1* | 2/2022 | Geltinger | B29C 49/42093 |
| 2023/0083845 A1* | 3/2023 | Schwab | B65B 25/008 264/1.1 |
| 2023/0084287 A1* | 3/2023 | Schwab | B29D 11/0023 264/1.1 |
| 2023/0311389 A1* | 10/2023 | Hidaka | B29C 49/06 73/865.8 |

FOREIGN PATENT DOCUMENTS

| | | | |
|---|---|---|---|
| EP | 2853887 A1 * | 4/2015 | G01N 25/72 |
| EP | 2801532 B1 | 9/2016 | |
| EP | 2868587 B1 | 10/2016 | |
| EP | 2801531 B1 | 1/2017 | |
| EP | 3424669 A1 * | 1/2019 | A24D 3/061 |
| JP | 2007315795 A * | 12/2007 | |
| WO | WO-2018036857 A1 * | 3/2018 | B29C 45/7686 |
| WO | 2022022955 A1 | 2/2022 | |

\* cited by examiner

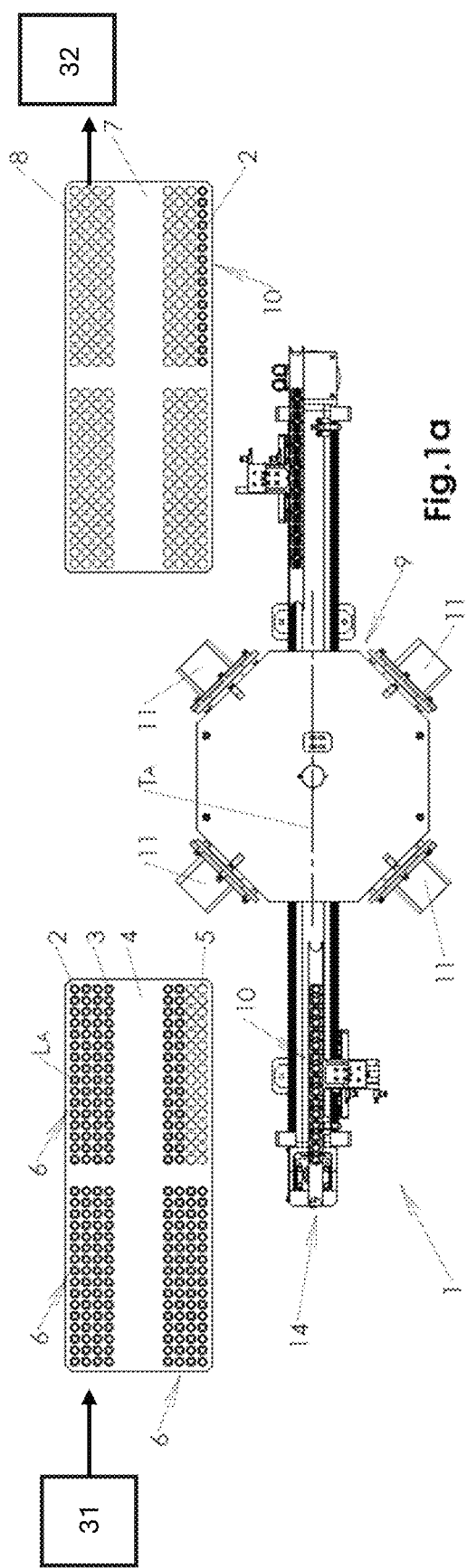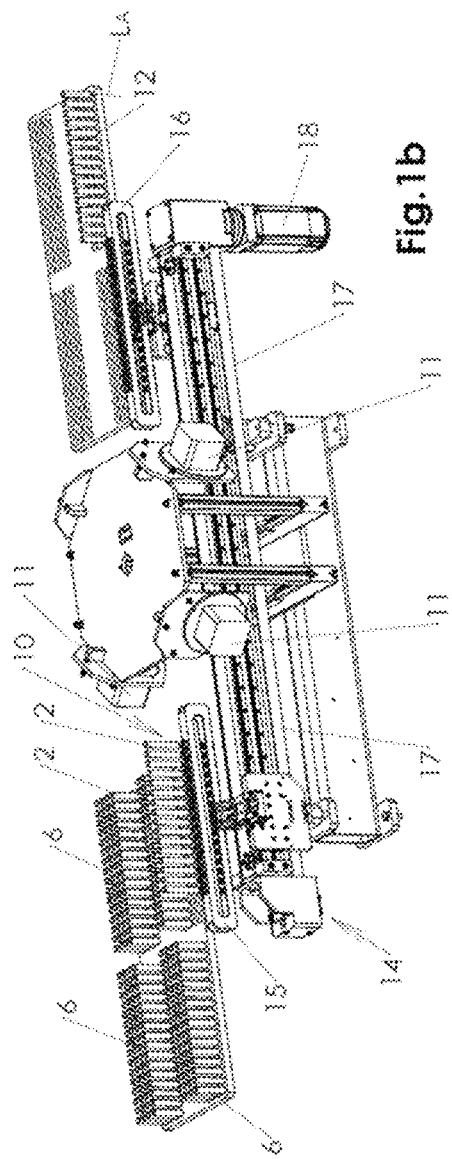

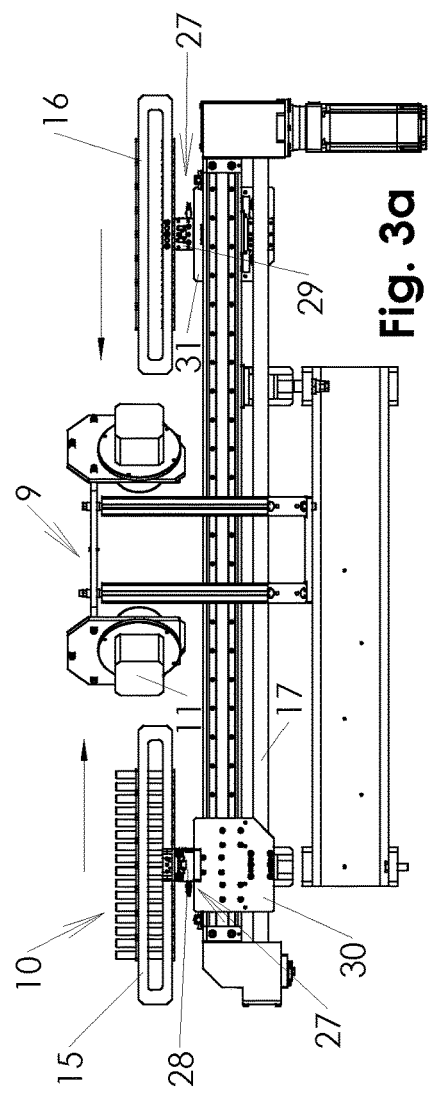
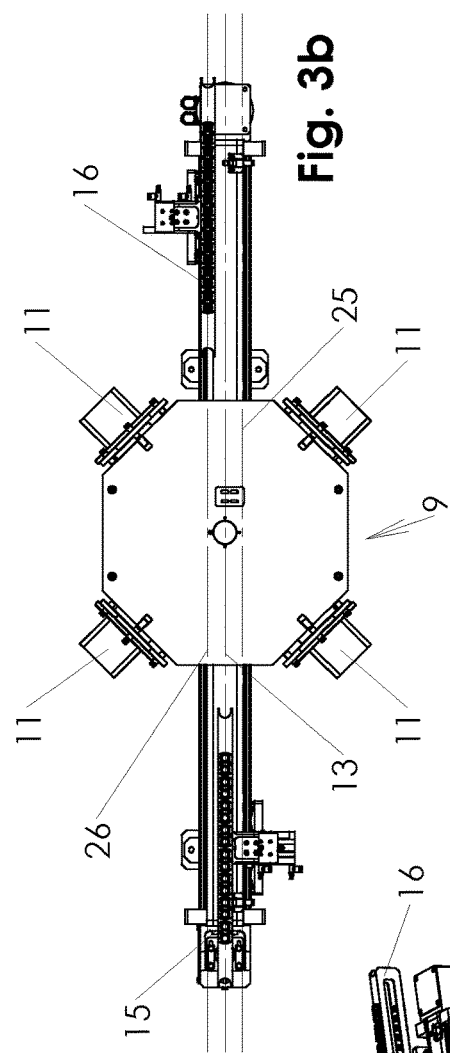
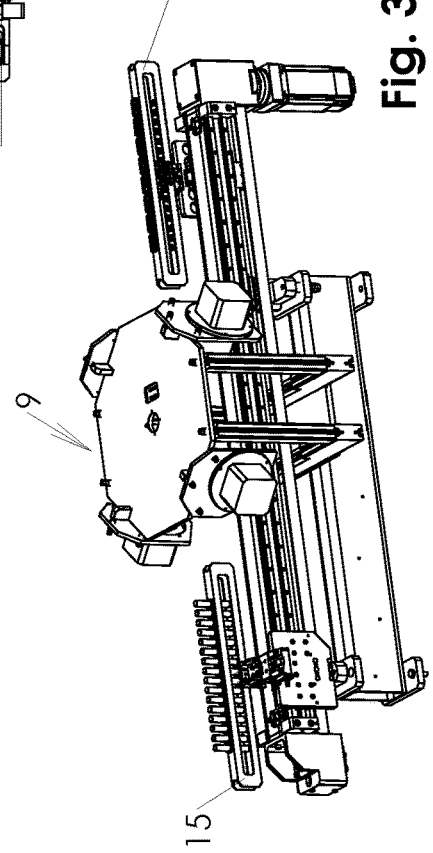

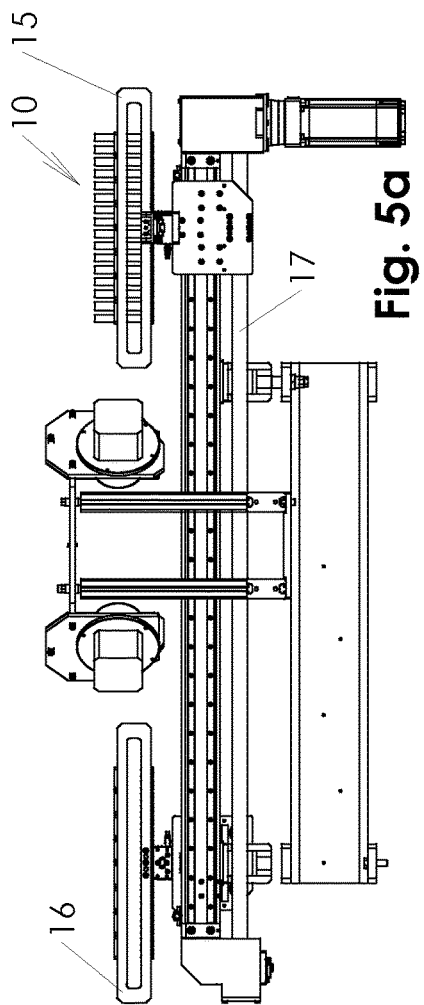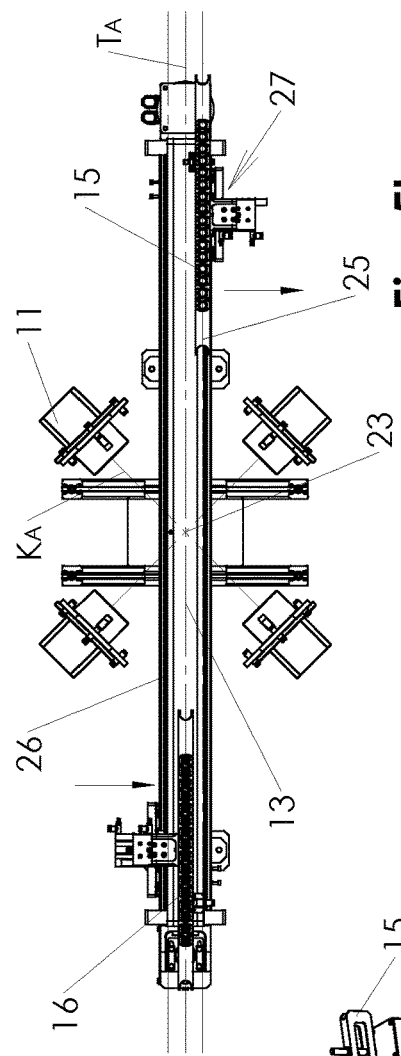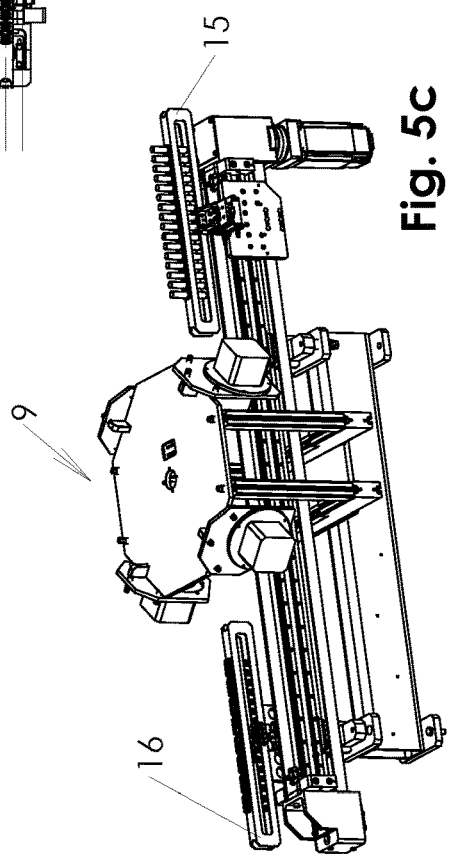

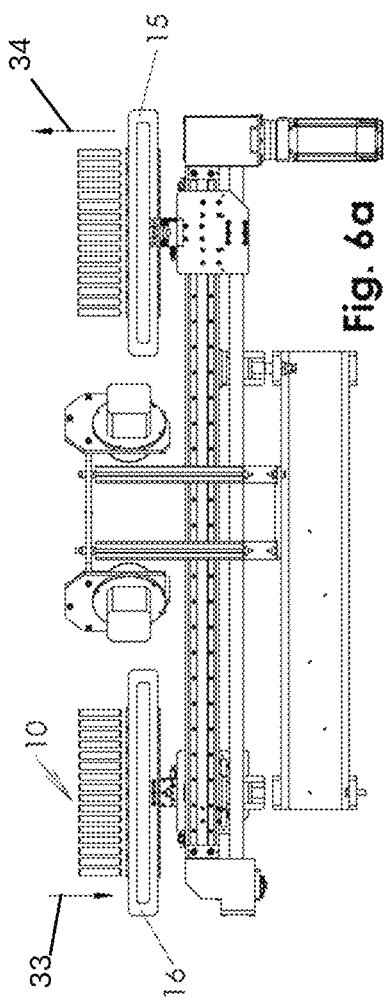
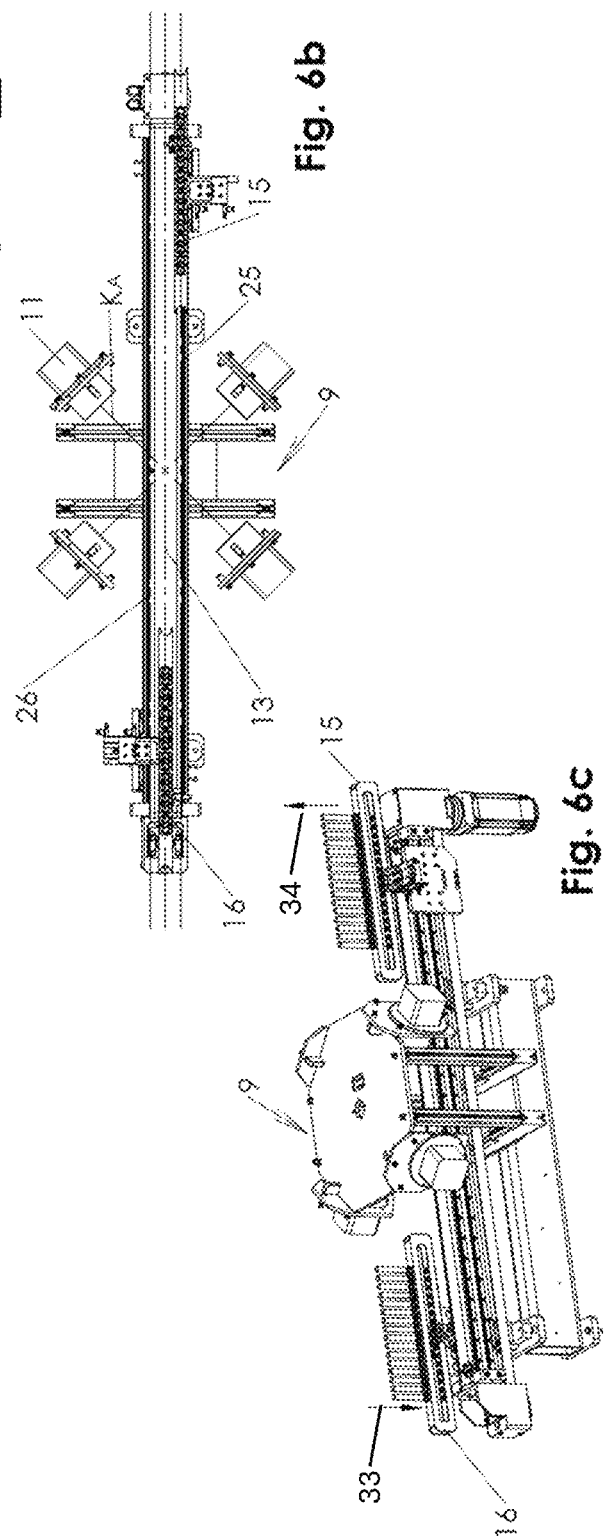

VARIO-TIP SYSTEM

BACKGROUND OF THE INVENTION

The invention relates to a packaging method for packaging injection-molded plastic parts in final package units, the injection-molded plastic parts being pipette tips or medical reaction vessels and each having an in particular vertically oriented longitudinal center axis, which very particularly preferably passes through a respective opening, in particular a filling opening, of the respective injection-molded plastic part, preferably centrally. Particularly preferably, the injection-molded plastic parts are rotationally symmetrical with respect to their longitudinal center axis. The packaging method comprises the steps of simultaneously removing multiple shots of K injection-molded plastic parts from K respective cavities, the K cavities preferably being distributed, preferably evenly, over C clusters (geometric cavity arrangements); evenly distributing the K injection-molded plastic parts in a cavity-pure manner over U cavity-pure subgroups in a first storing plane, wherein, according to a preferred embodiment of the method, the even and cavity-pure distribution of the K injection-molded plastic parts over the U cavity-pure subgroups in the first storing plane is carried out until each subgroup contains L injection-molded plastic parts, the number L of injection-molded plastic parts of one (each) of the subgroups corresponding to the maximum number A of injection-molded plastic parts that can be stored in one final package unit or to an integer divisor of A; filling up the final package units in a cavity-pure or cavity-sorted manner until the final package units each contain A injection-molded plastic parts.

Furthermore, the invention relates to a packaging device for cooperation with an injection molding device which can be disposed adjacent to the packaging device and whose injection molding tools are designed for producing pipette tips or medical reaction vessels.

Furthermore, the invention relates to an injection molding system which comprises an injection molding device and a packaging device.

DESCRIPTION OF RELATED ART

In known packaging methods for packaging injection-molded plastic parts, the injection-molded plastic parts being pipette tips or medical reaction vessels, in particular designed for blood analysis, K injection-molded plastic parts are simultaneously removed from K cavities of an injection molding device and temporarily stored as bulk material. Final package units are then loaded with A injection-molded plastic parts from this bulk material. A disadvantage of the known method is that it is not possible to assign the packaged plastic parts to specific cavities. It is therefore no longer possible to trace the cavity or cavities from which the injection-molded plastic parts of a particular final package unit originate. This means that if there is even a single defective injection-molded plastic part in one final package unit, the entire production has to be recalled and not just the final package units loaded with injection-molded plastic parts from a specific cavity or from specific cavities.

The packaging of injection-molded plastic parts which are pipette syringes or medical reaction vessels was revolutionized by the invention described in EP 2 323 930 B1 (WO 2011/003507 A1). This invention proposes that the K injection-molded plastic parts simultaneously removed from the K cavities by means of a removing gripper are simultaneously distributed over U subgroups and placed in an intermediate storage and that K injection-molded plastic parts are removed from the K cavities multiple times and are simultaneously distributed to the subgroups in the intermediate storage, i.e., before transfer to the final packages, until each subgroup contains L injection-molded plastic parts, the number L of injection-molded plastic parts of one (each) subgroup corresponding to the maximum number of injection-molded plastic parts that can be loaded in a final package unit or to an integral part thereof A. The final package units are then each filled with a single subgroup, i.e., in a cavity-pure manner, or with several of these subgroups, i.e., in a cavity-sorted manner.

The invention described in EP 2 801 531 B1 of the applicant develops the aforementioned method further in that it makes it possible to dispense with an intermediate storage and the storage plane in which the cavity-pure subgroups are formed is provided directly by the final package units.

In the invention described in EP 2 868 587 B1 of the applicant, the cavity-pure subgroups are formed on a table of a shuttle table arrangement and then adjusted vertically by rotating the shuttle table arrangement about a horizontal axis in order to make optimum use of the available space.

From EP 2 801 532 B1 of the applicant, another optimized method for cavity-pure or cavity-sorted packaging of pipette tips and medical reaction vessels is known, in which a single shot of injection molded parts is buffered in an intermediate buffer prior to the formation of cavity-pure subgroups in order to shorten the cycle time.

Another optimized packaging method for pipette tips is known from DE 10 2017 118 527 A1 of the applicant, which optimizes the basic method known from EP 2 323 930 B1 of the applicant in that a line formation of the injection-molded parts of a respective shot takes place before the arrangement of the injection-molded plastic parts in cavity-pure subgroups. The injection-molded parts of a shot arranged in a line are then arranged directly in cavity-pure subgroups.

WO 2022/022955 A1 of the applicant describes a further optimized packaging method for pipette tips and plastic injection molded parts being medical reaction vessels, with which the cycle time can be reduced even further. The invention described therein is based on the idea of not transferring each shot of K injection-molded plastic parts into the cavity-pure subgroups individually, but rather to first form a number of cavity-pure sub-subgroups corresponding to the number of cavities, each sub-subgroup receiving multiple injection-molded plastic parts from the same cavity, the subgroups then being filled or formed with cavity-pure sub-subgroups step by step. In this way, the adjustment or gripper mechanism can be made more robust and, in particular, more resistant to bending.

All the above-mentioned packaging methods with associated packaging devices of the applicant for injection-molded plastic parts being pipette tips or medical reaction vessels have proven their worth and have since ensured optimized product traceability. The cycle time has also been improved by the inventions described.

In practice, 100% of the injection-molded plastic parts divided into cavity-pure subgroups are subjected to an optical inspection from above, to which end the viewing axis of the camera used is oriented parallel to the longitudinal axes of the injection-molded plastic parts, i.e., in the vertical direction, and not directed at the circumferential surface of the injection-molded plastic parts. With the optical inspection from above and/or below, the diameter and the concentricity of the injection-molded plastic parts can be inspected. Damages in the upper or lower edge area of the injection-molded plastic parts can also be detected. Lateral inspection of all injection-molded plastic parts for detecting shape and/or surface defects in order to exclude sporadic defects while at the same time ensuring cavity-pure or cavity-sorted packaging in final packages has not been possible so far, but it is desirable because of the increased product safety associated with it. Shape defects are, for example, length defects and/or width defects and/or symmetry defects, in particular rotational symmetry defects. Surface defects are, for example, impurities and/or inclusions and/or damage, in particular scratches and/or holes.

SUMMARY OF THE INVENTION

Hence, the object of the invention is to provide a packaging method which is further improved with regard to product safety and with which sporadic defects, in particular shape and/or surface defects, can also be detected despite a cavity-pure arrangement of the injection-molded plastic parts, which are pipette tips or medical reaction vessels, in subgroups (fields). In other words, the improved method should allow 100% circumferential inspection of all injection-molded plastic parts, which are pipette tips or medical reaction vessels, and should also allow cavity-pure arrangement of the injection-molded plastic parts in subgroups and cavity-pure or cavity-sorted filling of the final package units.

Furthermore, the object is to specify a packaging device which is suitable for carrying out an optimized method as described above, and a correspondingly optimized injection molding system.

This object is attained with the features disclosed herein with respect to the method, and with respect to the device, and also with respect to the injection molding system.

Advantageous embodiments of the invention are indicated in the dependent claims. All combinations of at least two of the features disclosed in the description, the claims and/or the figures fall within the scope of the invention. To avoid repetition, features disclosed in connection with the device shall also be considered disclosed and claimable in connection with the method. Likewise, features disclosed in connection with the method shall also be considered disclosed and claimable in connection with the device.

The invention is based on the idea of subjecting the injection-molded plastic parts of the subgroups, preferably L injection-molded plastic parts in each case, to an optical lateral inspection for, preferably sporadic, defects, very particularly preferably for shape and/or surface defects, in a lateral inspection device, the lateral inspection device comprising not only a single digital camera but a plurality of digital cameras, which are in particular disposed, in particular distributed evenly, in a circumferential direction around an inspection position for injection-molded plastic parts, for cooperating with an inspection logic. In order to enable 100% lateral inspection, i.e., an inspection of all the injection-molded plastic parts previously combined or sorted into cavity-pure subgroups (fields), the injection-molded plastic parts being pipette tips or medical reaction vessels, the invention provides for the cavity-pure subgroups to be each divided into S, preferably cavity-pure, very particularly preferably equally large, sub-subgroups with injection-molded plastic parts disposed one behind the other, in particular linearly, and for the S sub-subgroups to each be transported one after the other through the lateral inspection device along their longitudinal or linear extension by transfer means, where they are subjected to lateral inspection. Preferably, the injection-molded plastic parts disposed one behind the other are moved one after the other through an inspection position where they are circumferentially viewed or recorded by the at least one digital camera. In order to inspect the injection-molded plastic parts across their entire circumference, i.e., circumferentially, it is, as mentioned, preferable to provide multiple digital cameras disposed, further preferably distributed evenly, in a circumferential direction, in particular around the aforementioned inspection position. Preferably, at least one digital camera is located on either side of a transfer or transport axis of the sub-subgroups through the lateral inspection device. By separating the subgroups into sub-subgroups, in particular in the form of injection-molded plastic parts disposed linearly one behind the other, it is made possible to successively subject all the injection-molded plastic parts of a subgroup to an optical lateral inspection for sporadic defects, in particular shape and/or surface defects.

According to the invention, the S sub-subgroups are (again) arranged in cavity-pure subgroups in a second, preferably horizontal, storing plane after passing through the lateral inspection. According to a preferred embodiment, the composition of the subgroups remains the same; in other words, the composition of the inspected subgroups in the second storage plane preferably corresponds to the composition of the (corresponding) subgroups in the first, preferably horizontal, storage plane, at least in the case of a successful optical inspection, i.e., if no or still acceptable defects, in particular shape and/or surface defects, of injection-molded plastic parts in the subgroup in question have been detected and therefore no injection-molded plastic parts of this subgroup have been replaced. In other words, the composition of the subgroups is preferably not changed by the function of the first and the second sub-subgroup gripper; it is only changed if defective injection-molded plastic parts have been replaced with non-defective injection-molded plastic parts from the same respective cavities. So, the subgroup reference before and after the inspection preferably remains the same for the injection-molded plastic parts not sorted out. Instead of replacing individual defective injection-molded plastic parts, it is also conceivable to sort out or discard the entire subgroup. In principle, the replacement of individual injection-molded plastic parts or the discarding of entire subgroups is an optional and a non-obligatory, but preferred, part of the method according to the invention and of the device according to the invention.

According to an embodiment of the invention, injection-molded plastic parts identified as defective may be sorted out and replaced with suitable, i.e., cavity-pure, injection-molded plastic parts before the formation of the inspected, cavity-pure subgroups in the second storing plane. Alternatively, it is conceivable to first arrange the defective injection-molded plastic parts in inspected, cavity-pure subgroups in the second storage plane and to replace them with cavity-pure injection-molded plastic parts in a subsequent step. It is also conceivable, as mentioned, to sort out the entire subgroup if a defective part is detected in a subgroup.

In the context of the invention, it is envisaged that the second storage plane is formed either directly by the final packages or by a static or adjustable, preferably horizontal, intermediate storage from which the inspected cavity-pure subgroups are then transferred into the final package units—either a single inspected subgroup per final package unit (cavity-pure) or several (not all) cavity-pure subgroups per final package unit (cavity-sorted).

As mentioned above, the composition of the inspected cavity-pure subgroups in the second storage plane preferably remains the same as the composition of the respective corresponding subgroups in the first storage plane, i.e., unaffected by splitting the subgroups into sub-subgroups, conveying the sub-subgroups through the lateral inspection device and then recombining the inspected sub-subgroups in the second storage plane. A (slightly) different composition of the not yet inspected and the inspected subgroups can preferably only result from the optional sorting out of injection-molded plastic parts recognized as defective by the lateral inspection device and/or at least one optional further inspection device (e.g., an aforementioned inspection from above and/or below). So the composition of the subgroups before and after the inspection preferably remains the same if no individual injection-molded plastic parts are sorted out. It is conceivable to arrange the rows of injection-molded plastic parts, which are preferably each formed by one sub-subgroup, in the respective inspected subgroup in the same manner relative to each other as in the corresponding subgroup in the first storing plane or differently, for example in reverse order, as long as the overall composition remains the same in the case of successful inspection, i.e., in the case of non-detection of a defect. Preferably, both the subgroups in the first storing plane and the inspected subgroups in the second storing plane are geometrically arranged as fields with a preferably rectangular envelope contour in the respective storing plane. The envelope contour is not limited to a rectangular shape. In principle, all field or envelope contour shapes that can be composed of lines or row arrangements of injection-molded plastic parts can be realized, for example also hexagonal or octagonal envelope contours, etc. In case the subgroup reference does not remain the same, the sub-subgroups can be formed into new subgroups in the second storing plane, as long as they are still cavity-pure.

There are different possibilities with regard to the formation/creation of the subgroups in the first storing plane; in this respect, reference is expressly made to earlier patent applications and patents of the applicant, in particular those mentioned in the introduction to the description. It is conceivable, for example, to always expand the subgroups by a single injection-molded plastic part after each shot or alternatively to first form cavity-pure sub-subgroups and then to assemble the subgroups in the first storing plane from cavity-pure sub-subgroups.

Regardless of how the cavity-pure subgroups are formed in the first storing plane, it is preferable if these cavity-pure subgroups (preferably like the inspected subgroups) are formed as fields with a rectangular envelope contour. It is particularly preferable if the subgroups are formed from parallel lines of injection-molded plastic parts disposed next to each other; particularly preferably, each sub-subgroup to be inspected is formed by one of these lines, each comprising multiple, in particular S, injection-molded plastic parts.

According to a particularly preferred embodiment of the method, the subgroups in the first storing plane are finished first, i.e., completed, before a division into the S sub-subgroups takes place. The claims preferably also cover an alternative embodiment in which the subgroup formation or subgroup removal for lateral testing purposes is started before the subgroups in the first storing plane are completed.

With regard to the arrangement of the at least one digital camera, it is intended that the at least one digital camera is directed at the lateral surface/circumferential surface of the injection-molded plastic part to be inspected in each case. It is particularly preferred if an optical (camera) axis or a camera zero line running centrically through the lens assembly of the camera intersects the longitudinal center axis of the injection-molded plastic part to be inspected at an angle. As mentioned above, it is particularly advantageous to provide multiple digital cameras, in particular four, digital cameras, which are very preferably evenly spaced in a circumferential direction, in particular at least one camera, preferably two cameras, on each side of an inspection track to be discussed later or on both sides of a transfer axis, in order to cover a particularly large circumferential surface area. The optical camera axis of the at least one digital camera preferably runs at an angle to the vertical and is horizontal, for example.

As mentioned, it is preferred if the injection-molded plastic parts of each sub-subgroup are disposed, preferably linearly, one behind the other, preferably along a transfer axis along which they are moved through the inspection device.

The digital cameras cooperate with an inspection logic which detects, in particular by means of image processing software, preferably sporadic defects, in particular shape and/or surface defects; according to an embodiment of the invention, in the event of detection of unacceptable defects, replacement means are or can be actuated directly or indirectly via the inspection logic, with which injection-molded plastic parts identified as defective are sorted out before or after the arrangement in the inspected subgroups and replaced with cavity-pure injection-molded plastic parts with the result that the final package units are equipped only with injection-molded plastic parts free from lateral defects in a cavity-pure or cavity-sorted manner.

The method according to the invention (and the device configured to carry out the method) has/have considerable advantages over the prior art. For the first time, 100% lateral inspection, in particular for shape and/or surface defects, is also possible for injection-molded plastic parts previously assembled into subgroups, in particular into cavity-pure fields, the injection-molded plastic parts being pipette tips or medical reaction vessels, thus ensuring a cavity-pure or cavity-sorted packaging in final package units. This considerably increases product safety, as even sporadic side defects of injection-molded plastic parts packaged in final packages can be reliably avoided. In addition to guaranteeing 100% lateral inspection and cavity-pure or cavity-sorted packaging in final packages at the same time, the invention also makes it possible to statistically assign defects determined by the lateral inspection, in particular shape and/or surface defects, to specific cavities. So it is possible and preferred for the cavities from which certain defects or defective cavities originate to be evaluated or traced.

It is essential that the packaging units or final package units in question, in which either the inspected subgroups are formed or which, after previous formation of the inspected subgroups in an intermediate storage, are each filled with a single or multiple (not all) cavity-pure inspected subgroups, are final package units which, after complete filling, are delivered to end customers, the delivery step to the end customer or the handover to a forwarding agent or a similar transport unit being a method step according to the invention, which is hereby disclosed as claimable.

According to an advantageous embodiment of the invention, the sub-subgroups with their injection-molded plastic parts, which are preferably disposed linearly one behind the other, are conveyed through the lateral inspection device along an inspection track by means of the transfer means, in particular in such a manner that a preferably horizontal optical axis of the at least one digital camera or, if provided as is preferred, the optical axes of multiple digital cameras spaced apart in the circumferential direction, very particularly evenly, intersects/intersect, preferably perpendicularly, the preferably vertical longitudinal center axis of one of the injection-molded plastic parts in each case in an inspection position located on the inspection track. In such an embodiment, the injection-molded plastic part moved through the inspection position is captured/recorded in the inspection position by the at least one digital camera and inspected for sporadic lateral defects.

In order to enable a transport of the sub-subgroups as fast as possible through the lateral inspection device, it is further provided according to an embodiment of the invention that the transfer means for conveying the sub-subgroups through the lateral inspection device comprises a first and a second work piece support each serving to receive one of the S sub-subgroups, the work piece supports being moved back and forth along a transfer axis between respective loading positions, in which they are loaded with one of the S sub-subgroups from the subgroups of the first storing plane, and respective unloading positions, from which, after optical inspection, the respective sub-subgroups are transferred into the second storing plane for cavity-pure subgroup (re) formation or subgroup reconfiguration, and that the first and the second work piece support are conveyed through the lateral inspection device along a shared inspection track with one of the S sub-subgroups during the transfer from the respective loading positions to the respective unloading positions. In other words, two work piece supports are provided which alternately convey one sub-subgroup each through the lateral inspection device, one of the work piece supports being loaded with a sub-subgroup to be inspected, while the other work piece support is unloaded after inspection of the sub-subgroup located thereon. In this manner, the cycle time can be significantly optimized. The unloaded work piece support then returns empty to its loading position, while the loaded work piece support is conveyed through the lateral inspection device along the inspection track to its unloading position. With regard to the option of a fixed camera assembly, it is intended that both work piece supports share an inspection track within the inspection device; i.e., they are conveyed through the inspection device on the same track/axis (i.e., a shared inspection track), while the inspection of the injection-molded plastic parts located is taking place by means of the at least one digital camera.

There are different options with regard to the realization of the back and forth movement of the work piece supports. It is particularly preferred if the back and forth movement of the first and second work piece supports between their respective unloading and loading positions takes place in a coupled movement. The movement can be mechanically coupled, for example by providing a shared reciprocating belt drive or chain drive. This has the advantage that only a single shared, preferably electric, drive needs to be provided. Alternatively, in the case of the provision of multiple drives, such as servomotor drives, these drives may be coupled electronically, i.e., synchronized.

In order to avoid a collision of the work piece supports when they meet in the inspection device despite the provision of a shared inspection track for the first and the second work piece support on their respective inspection paths through the lateral inspection device, another embodiment of the invention provides that at least one of the work piece supports is moved by moving means relative, in particular perpendicular, angular or in a pivoting movement, to the transfer axis in such a manner that the work piece supports are moved past each other along the transfer axis in the inspection device, while the work piece support that is loaded with one of the S sub-subgroups is located in the inspection track. It is preferred if the work piece supports are moved past each other in a shared horizontal plane, although in principle it is also possible to move them past each other one above the other, i.e., to move them past each other with a vertical offset, by providing appropriate lifting means. An embodiment in which moving means are assigned to each of the work piece supports so that each of the work piece supports can be moved into and out of the inspection track, preferably into or out of its own track, is preferred. In this case, three parallel tracks are preferably provided.

As mentioned, the work piece supports meet during their back and forth movement within the inspection device, preferably during the inspection of the injection-molded plastic parts by means of at least one camera. In order to enable or simplify an inspection of the injection-molded plastic parts in the filled work piece support despite the fact that the work piece supports are to be moved past one another, preferably in a horizontal plane, another embodiment of the invention provides that the work piece supports each have a lateral opening, in particular on both sides, the injection-molded plastic parts of a sub-subgroup disposed in the work piece support in question protruding into, preferably vertically from above, in particular extending vertically through this opening and being optically inspected by the at least one camera through the lateral opening. There are many options with regard to the concrete design of the lateral opening(s). Preferably, each work piece support is open on both sides perpendicular to the transfer axis or has a lateral opening there. In particular, each work piece support is provided with a through hole perpendicular to the transfer axis so that at least one digital camera, in particular at least two digital cameras disposed on both sides of the inspection track, can capture the circumferential surface of each of the injection-molded plastic parts. The lateral openings in the work piece supports are preferably aligned perpendicular to the transfer axis when the work piece supports are moved past each other in the inspection device.

It is very particularly preferred to arrange the at least one digital camera, very particularly preferably multiple digital cameras of the lateral inspection device in such a manner that the injection-molded plastic parts in the first work piece support are optically inspected through the lateral opening of the second work piece support and/or the injection-molded plastic parts in the second work piece support are optically inspected through the lateral opening of the first work piece support.

As explained, the invention also relates to a packaging device for carrying out a method according to the invention. For this purpose, the device has corresponding functional means which are configured and controlled by control means in such a manner that they execute the respective method steps. Thus, the packaging device according to the invention comprises at least one removing gripper, which is configured and controlled by control means to simultaneous remove multiple shots of K injection-molded plastic parts from K respective cavities of an injection molding device (not belonging to the packaging device, but preferably disposed or disposable next to it within the framework of the system), the tools of which are configured to produce pipette tips or medical reaction vessels and in which the K cavities are preferably evenly distributed over C clusters. Furthermore, the packaging device comprises subgroup forming means for forming cavity-pure subgroups in the first storing plane. The device further comprises means for cavity-pure and/or cavity-sorted filling of final package units. In case the second storing plane is an intermediate storage, these means can be or comprise a transfer gripper for transferring the inspected subgroups from the second storing plane into the final package units. In the case of direct loading, the means preferably comprise or are formed by a second sub-subgroup gripper, with which the sub-subgroups can be placed directly into the final package units; i.e., the cavity-pure inspected subgroups are formed directly in the final package units.

The device is characterized by first and second sub-subgroup grippers for loading and unloading the transfer means, respectively, with which sub-subgroups can be conveyed through the inspection device of the packaging device.

All grippers or gripper means mentioned in the context of the disclosure can be mechanical grippers or preferably vacuum grippers, for example, the latter fixing the injection-molded plastic parts by suction during the transfer between two positions.

The packaging device is characterized in particular by the aforementioned optical lateral inspection device, which comprises at least one digital camera, along which in particular all the injection-molded plastic parts previously sorted or combined into cavity-pure subgroups in the first storing plane are conveyed in sub-subgroups with injection-molded plastic parts (not belonging to the device) disposed in particular linearly one behind the other for inspection purposes.

There are different options with regard to the concrete design of the moving means for moving at least one preferably provided work piece support perpendicular to the transfer axis for collision avoidance during the movement of the work piece supports past each other in the inspection device. It is preferable if the moving means comprise a slide which is movable perpendicular to the transfer axis and on which the work piece support in question is disposed and via which the work piece support can then be moved into and out of the inspection track. The slide can be driven pneumatically or by servomotor, for example; in the preferred case of a belt drive, a slide support is fixed to the belt.

In principle, it is possible to dispose only one of the work piece supports on a slide which can be driven pneumatically or by servomotor, for example; an embodiment in which each work piece support is disposed on a correspondingly movable slide is preferred, in which case preferably both slides are fixed to the belt drive via respective slide carriers.

Moreover, the invention relates to an injection molding system comprising an injection molding device as described above for producing pipette tips or medical reaction vessels, in which the K cavities are preferably evenly distributed over C clusters, and a packaging device according to the invention. With regard to a preferred design and arrangement of the C clusters, express reference is made to the applicant's published WO 2022/022955 A1. There, a typical cavity arrangement in clusters is shown in FIG. 1 as an example; of course, the number of clusters and the number of cavities per cluster may vary.

BRIEF DESCRIPTION OF THE DRAWINGS

Further advantages, features and details of the invention will be apparent from the following description of a preferred embodiment and from the drawings.

FIG. 1a is a plan view of part of a packaging device with an optical lateral inspection device, FIG. 1a showing both part of a first storing plane with cavity-pure subgroups and part of a second storing plane, in which cavity-pure subgroups inspected sub-subgroup by sub-subgroup are formed, the second storing plane in the shown example being formed by a static or adjustable intermediate storage, from which final package units (not shown) are then each loaded with one or more inspected cavity-pure subgroups each, direct loading being alternatively possible, in which case the second storing plane is formed directly by the final package units;

FIG. 1b is a perspective side view of the illustration according to FIG. 1a;

FIG. 3a to FIG. 3c show different illustrations of the units according to FIG. 2a to FIG. 2c with a loaded work piece support at the beginning of the transfer;

FIG. 5a to FIG. 5c show different illustrations of the units according to the preceding figures as the work piece support (still) filled with an inspected sub-subgroup is being moved out of the shared inspection track and the work piece support to be filled in the next step is being moved into the shared inspection track; and FIG. 6a to FIG. 6c shows the units from the preceding figures during alternate loading and unloading of the work piece supports.

In the figures, identical elements and elements with the same function are marked with the same reference signs.

DETAILED DESCRIPTION

Figure 2A:
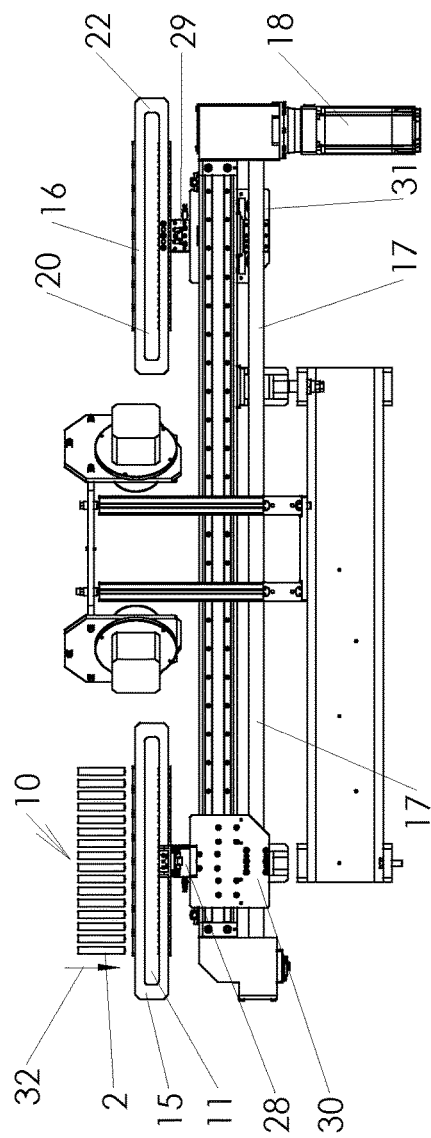
FIG. 2a to FIG. 2c show different views of the optical lateral inspection device and the transfer means during loading of a first work piece support.

The figures, in particular FIGS. 1a and 1b, show part of a packaging device 1 for preferably rotationally symmetrical injection-molded plastic parts 2, which are pipette tips or medical reaction vessels. They each have a longitudinal center axis $L_A$ which is preferably vertical and, in the example shown in FIG. 1, oriented perpendicular to the drawing plane. The respective longitudinal center axes $L_A$ run centrally through respective, in this case upper, openings 3, which are filling openings.

FIG. 1a shows part of a first storage plane 4 in the form of a horizontal intermediate store comprising seats 5 for the injection-molded plastic parts 2. An injection molding device that does not belong to the packaging device but to the injection molding system and is preferably disposed upstream of the packaging device is not shown. At least one removing gripper 31 is schematically shown and control means for controlling the removing gripper (and other functional units) for simultaneously removing multiple shots of K injection-molded plastic parts from K respective cavities of the injection molding device, the K cavities preferably being evenly distributed over C clusters, is not shown. Subgroup forming means configured and controlled by control means to evenly and cavity-purely distribute the K injection-molded plastic parts (individually or in sub-subgroups) to U cavity-pure subgroups 6 in the first storing plane 4 comprises the removing gripper 31. Means for cavity-pure or cavity-sorted filling of the final package units 32 are schematically shown in FIG. 1a.

With regard to concrete options for realizing the elements or units and functional means not shown, reference is made to the applicant's earlier applications and patents mentioned in particular in the introduction to the description.

FIG. 1a shows a second storing plane 7 in the form of a horizontal intermediate storage to the right of the first storing plane 4; the second storing plane 7 can alternatively be formed directly by final packages (not shown). The second storing plane 7 also has seats 8 for seating injection-molded plastic parts 2 inspected for sporadic defects, in this case by means of an optical lateral inspection device 9. In the second storing plane 7, the inspected injection-molded plastic parts 2, or more precisely sub-subgroups 10 of injection-molded plastic parts 2 disposed linearly one behind the other, are reassembled to form cavity-pure subgroups, in this case k inspected subgroups, the composition of the inspected subgroups in the second storing plane 7 corresponding to the composition of the cavity-pure subgroups not yet inspected in the first storing plane 4, at least in the case of a successful inspection, i.e., if no defects are detected. In principle, it is conceivable that the rows in the inspected subgroups are arranged identically to the corresponding subgroups in the first storing plane 4, although the rows, in particular the sub-subgroups of the subgroup in question, can alternatively be arranged in a different order, in particular in reverse order. The composition remains the same (in principle, i.e., independently of the embodiment shown), i.e., the sub-subgroups belonging to one of the subgroups in the first storing plane are reassembled to form the same subgroup, although individual injection-molded plastic parts can be replaced after a defect has been detected.

FIG. 1a shows that the subgroups 6 in the first storing plane 4 and later the inspected subgroups in the second storing plane 7 are geometrically formed as fields, each field having a rectangular envelope contour. Each subgroup 6 in the first storing plane 4 and later each inspected subgroup 6 in the second storing plane 7 consists of several rows of injection-molded plastic parts 2 disposed linearly one behind the other, presently from left to right and parallel to a transfer axis $T_A$, which is to be discussed later, each row forming a sub-subgroup 10 to be inspected, which is transferred through the lateral inspection device 9 along the transfer axis $T_A$.

In the embodiment shown, the lateral inspection device 9 comprises four digital cameras 11 evenly spaced (here at a 90° angle) in the circumferential direction for detecting the lateral or circumferential surface 12 of the injection-molded plastic parts 2 extending around the longitudinal center axis $L_A$ of each injection-molded plastic part 2. The digital cameras 11 are distributed on two sides of a shared inspection track 13 (cf. for example FIG. 3b).

The packaging device 1 comprises transfer means 14 for transferring cavity-pure sub-subgroups 10 through the lateral inspection device 9.

In the embodiment shown, the transfer means 14 comprise a first 15 and a second work piece support 16 each serving to receive a sub-subgroup 10. The two work piece supports 15, 16 are movable back and forth between respective loading positions (on the left in FIG. 1a and FIG. 1b) and respective unloading positions (on the right in FIG. 1a and FIG. 1b) in a mechanically coupled movement, presently by means of a belt drive 17 comprising a shared electromotive drive. In the loading position, an empty work piece support 15—the first work piece support 15 in the case at hand—is loaded with a sub-subgroup 10 of injection-molded plastic parts 2 disposed linearly one behind the other, each sub-subgroup 10 corresponding to a row of injection-molded plastic parts 2 of an associated subgroup 6. The division of the subgroups 6 into sub-subgroups 10 and the loading of the work piece supports 15, 16 with the sub-subgroups 10 is carried out by means of a first sub-subgroup gripper 33 (FIGS. 6a, 6c), while the unloading of the work piece support 15, 16 located in an unloading position is carried out by means of a second sub-subgroup gripper 34 (FIGS. 6a, 6c), by means of which the sub-subgroups 10 are reassembled in the second storing plane 7 to form inspected cavity-pure subgroups.

Preferably provided replacement means controlled by and cooperating with the inspection logic of the lateral inspection device and comprising sorting-out means for sorting out injection-molded plastic parts 2 recognized as defective and for replacing the vacated space by non-defective, preferably already inspected plastic parts which are cavity-pure, i.e., belong to the respective subgroup or originate from the same cavity, and which can be taken from a corresponding supply, are not shown.

The Figures show that the work piece supports 15, 16 are open laterally, i.e., perpendicular to the transfer axis $T_A$; i.e., they have lateral openings 19, 20, into which the injection-molded plastic parts 2 to be inspected of a respective sub-subgroup 10 protrude—in this case, they protrude through them—in order to then be laterally detected by the cameras 11 through the lateral openings 19, 20. According to a preferred embodiment, the lateral openings 19, 20 are formed as through holes, i.e., passage openings, in a respective work piece support frame 21, 22.

Figure 4A:
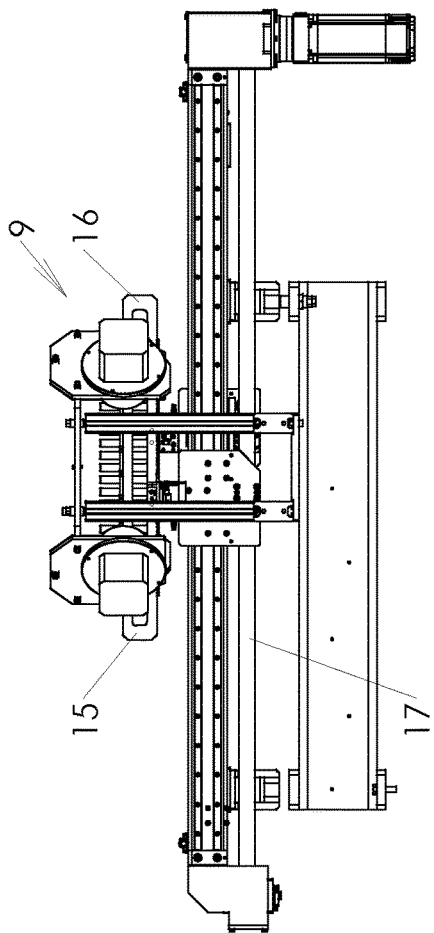
FIG. 4a to FIG. 4d show partially enlarged views of the units according to FIG. 3a to FIG. 3c during inspection of the injection-molded plastic parts as they are passing through the lateral inspection device by means of the work piece support filled with a sub-subgroup on a shared inspection track for the work piece supports.
Figure 4B:
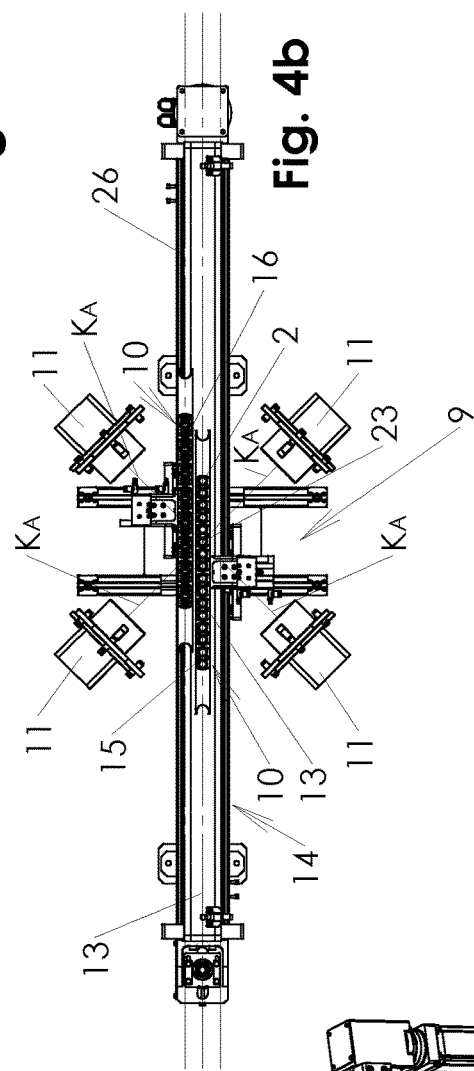
Figure 4D:
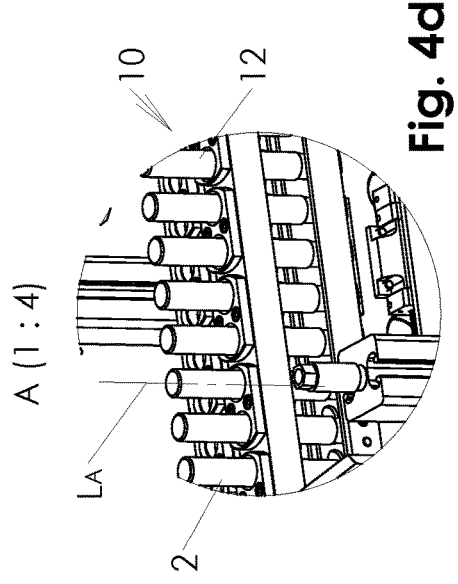
Figure 4C:
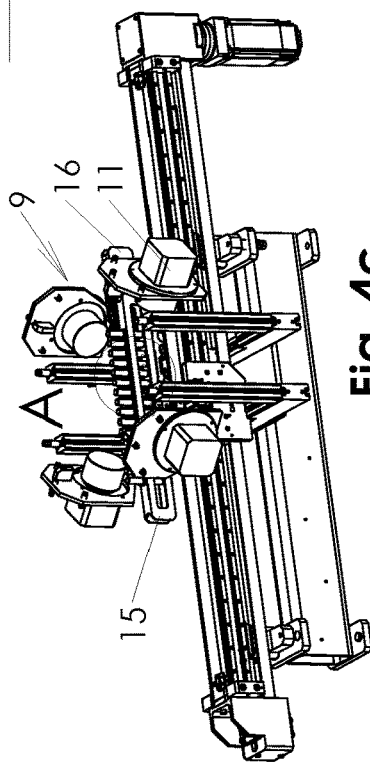

As shown in FIG. 4a to FIG. 4d, the injection-molded plastic parts 2 of a sub-subgroup 10 to be inspected are inspected by the cameras 11 through the lateral openings 19, 20, the cameras 11 viewing the respective circumferential surfaces, namely in an inspection position 23 shown in FIG. 4b, in which camera axes $K_A$ of the digital cameras 11 meet and intersect the longitudinal center axis $L_A$ of the injection-molded plastic part 2 of a sub-subgroup 10 located in the inspection position 23 at an angle, in this case vertically.

The inspection position 23 is located on a shared inspection track 13 for both work piece supports 15, 16, which the work piece supports 15, 16 pass through in order for the respective received sub-subgroups 10 to be inspected.

FIG. 4a to FIG. 4d in particular also show that the work piece supports 15, 16 are moved past each other in the inspection device 9. In the embodiment shown, the injection-molded plastic parts 2 located on the first work piece support 15 are inspected through its lateral opening 19 and through the lateral opening 20 in the passing second work piece support 16, which is aligned with lateral opening 19. The lateral openings 19, 20 in the work piece supports 15, 16 are aligned perpendicular to the transfer axis $T_A$ when the work piece supports are moved past each other in the inspection device 9.

In the specific embodiment, the transfer means 14 comprise, in addition to the shared inspection track 13, a first return track 25 for the first work piece support 15 and a second return track 26 for the second work piece support 16. The work piece supports 15, 16 can be moved between the shared inspection track 13 and the respective return track 25, 26 perpendicularly to the transfer axis by means of moving means 27.

In the specific embodiment example, the moving means 27 for each work piece support 15, 16 comprise a first and a second slide 28 and 29, respectively, which can be actuated pneumatically in the case at hand. Each slide 28, 29 is firmly connected to a respective side of the belt drive 17 via an associated support 30, 31.

Alternatively, it is also conceivable to move only one of the work piece supports 15, 16 between the shared inspection track 13 and a parallel track spaced therefrom, for example by means of a slide 28, 29.

It is essential that a single work piece support 15, 16 or both work piece supports 15, 16 is/are moved in such a manner that they can be moved past each other without colliding despite the fact that one of the work piece supports 15, 16 is located on the shared inspection track 13 in the inspection device.

It can also be varied whether the respective loading position is disposed, for example, on the shared inspection track 13 or inspection axis or on a track parallel thereto, in particular a return track 25, 26. The same applies analogously to the unloading position for each work piece support 15, 16, which can alternatively be disposed on the shared inspection track 13 or axis or in a track parallel thereto, in particular a return track 25, 26. Depending on the loading position, the associated gripper, i.e., the first or the second sub-subgroup gripper, must merely be controlled accordingly.

Figure 2B:
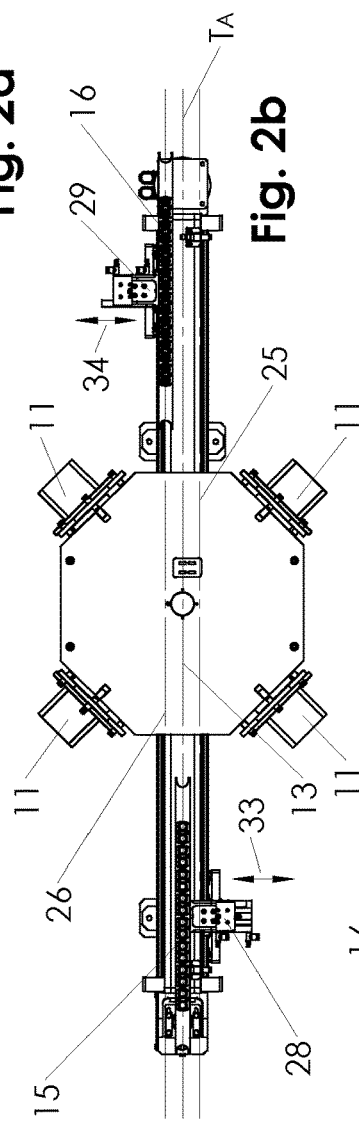
Figure 2C:
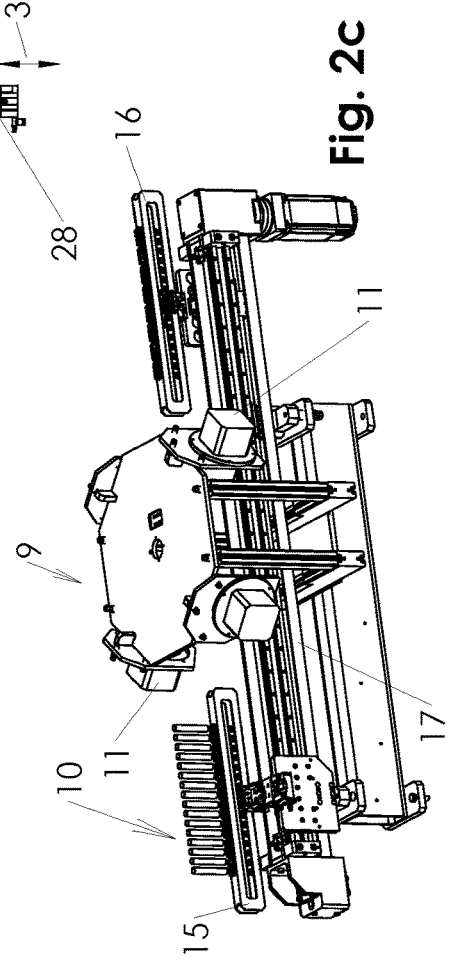

FIGS. 2a to 2c show the method step of loading, in this case the first, work piece support 15 with a cavity-pure sub-subgroup 10 of injection-molded plastic parts 2 disposed one behind the other along the transfer axis $T_A$ by means of the first sub-subgroup gripper (not shown), the injection-molded plastic parts 2 being inserted into the work piece support 15 along arrow 32, i.e., in the vertical direction from top to bottom, and then extending through its lateral opening 19. FIG. 2b shows the associated loading position of the first work piece support 15. In the case at hand, the loading position is located at the left end of the shared inspection track 13 as an example. FIG. 2b shows the possibility of moving the first work piece support 15 with the moving means 27, in this case the first slide 28, perpendicular to the transfer axis $T_A$ in arrow directions 33, specifically between the shared inspection track 13 and the associated return track 25. Similarly, the second work piece support 16 can also be moved by means of the moving means 27, specifically the second slide 29, perpendicular to the transfer axis $T_A$, specifically between the shared inspection track 13 and the second return track 26 associated with the second work piece support 16. For this purpose, the work piece support 16 can be moved in arrow directions 34 by means of the moving slide 19.

It can be seen that the unloading position of the second work piece support 16 is located on its return track 26 as an example.

FIGS. 3a to 3c essentially correspond to FIGS. 2a to 2c with the difference that the first work piece support 15 has already been loaded with a sub-subgroup 10 and, as indicated by the arrows in FIG. 3a, the work piece supports 15, 16 are moved in opposite directions along the transfer axis $T_A$, in this case in the direction of the lateral inspection device 9, by means of the belt drive 17. In contrast to the situation in FIGS. 3a to 3c, the work piece supports 15, 16 in the situation in FIGS. 4a to 4d are located in the lateral inspection device 9 and the injection-molded plastic parts 2 are being inspected for shape and/or surface defects by means of the digital cameras 11, which record their circumference. The first work piece support 15 is located on the shared inspection track 13, while the empty second work piece support 16 passes the first work piece support 15 on its return track 26. One after the other, the injection-molded plastic parts 2 of the sub-subgroup 10 on the first work piece support 15 thus pass through the inspection position 23 and are inspected by the analysis of the circumferential surface.

In the situation according to FIGS. 5a to 5c, the sub-subgroup 10 located on the first work piece support 15 has been inspected. The work piece supports 16 are located in an end position; specifically, the second work piece support 16 is located in its loading position and the first work piece support 15 is located in its unloading position. A track change has taken place in the end positions. It can be seen that the second work piece support 16 is now located on the inspection track 13, on which its loading position is also realized as an example. The first work piece support 15 has been moved to its return track 25 with the aid of its (moving) slide 27. This is indicated by movement arrows depicted in the drawing. It is preferred for the work piece supports 15, 16 to be moved perpendicular to the transfer axis $T_A$ in the respective end positions of the work piece supports 15, 16 alternatively when moving means 27 for only one work piece support 15, 16 are provided in the end positions of this work piece support 15, 16; alternatively, the work piece supports 15, 16 may also be moved along the transfer axis $T_A$ during the movement or the transfer.

In the situation according to FIGS. 6a to 6c, the second work piece support 16, which is located in its loading position, is loaded with a sub-subgroup 10 of injection-molded plastic parts 2 yet to be inspected by means of a first sub-subgroup gripper (not shown), while the first work piece support 15, which is located in its unloading position, is unloaded by means of a second sub-subgroup gripper (not shown) and then placed on or in the second storage plane 7 in such a manner by means of the second sub-subgroup gripper that inspected, cavity-pure subgroups are formed.

Subsequently, the second work piece support 16 with its sub-subgroup 10 to be inspected is moved through the lateral inspection device 9 on the shared inspection track 13, and the first work piece support 15, which has been emptied, is moved past it in the direction of its loading position, which can coincide with the loading position of the second work piece support 16 or offset parallel thereto.

REFERENCE SIGNS 1 packaging device
2 injection-molded plastic parts
3 opening
4 first storing plane
5 seats
6 cavity-pure subgroups
7 second storing plane
8 seats
9 optical lateral inspection device
10 sub-subgroups
11 digital cameras
12 circumferential surface
13 shared inspection track
14 transfer means
15 first work piece support
16 second work piece support
17 belt drive
18 electric motor drive
19 lateral openings
20 lateral openings
21 work piece support frame
22 work piece support frame
23 inspection position
25 first return track
26 second return track
27 moving means for the work piece supports
28 first (moving) slide
29 second (moving) slide
30 support
31 support
32 arrow direction 33 arrow directions
34 arrow directions
$L_A$ longitudinal center axis
$T_A$ transfer axis
$K_A$ camera axes

The invention claimed is:

1. A packaging device for packaging injection-molded plastic parts in final package units, the injection-molded plastic parts being pipette tips or medical reaction vessels, the packaging device being configured to implement a packaging method and to interact with an injection molding device disposed adjacent to the packaging device and configured to produce pipette tips or medical reaction vessels, the packaging device comprising:
   at least one removing gripper configured and controlled by control means to simultaneously remove multiple shots of a number K of injection-molded plastic parts from the number K of respective cavities of an injection molding device, the number K of the respective cavities being distributed evenly over a number C of clusters,
   subgroup forming means, comprising the at least one removing gripper, configured and controlled by control means to evenly distribute the number K of the injection-molded plastic parts in a cavity-pure manner over a number U of cavity-pure subgroups in a first storing plane until each subgroup contains a number L of injection-molded plastic parts, the number L of the injection-molded plastic parts of one subgroup corresponding to a maximum number A of injection-molded plastic parts that can be contained in one final package unit or to an integer divisor of A,
   means configured to fill up the final package units in a cavity-pure and/or cavity-sorted manner until the final package units each contain the number A injection-molded plastic parts,
   wherein the packaging device has a lateral inspection device comprising at least one digital camera, the lateral inspection device being configured and controlled to subject the injection-molded plastic parts of the subgroups to an optical lateral inspection before the final packages are filled up,
   wherein the lateral inspection device is configured to detect defective injection-molded plastic parts which are to be sorted out, and
   wherein the packaging device has first sub-subgroup grippers for dividing each of the subgroups into a number S sub-subgroups of injection-molded plastic parts disposed one behind the other linearly, and transfer means for transferring the S sub-subgroups one after the other, the transfer means being configured to transport the S sub-subgroups through the lateral inspection device one after the other for lateral inspection, and
   wherein the packaging device has second sub-subgroup grippers configured and controlled by control means in such a manner that the S sub-subgroups are arranged in inspected cavity-pure subgroups in a second storing plane after having passed through the lateral inspection device, the composition of the cavity-pure subgroups corresponding to the composition of the subgroups of the first storing plane when no individual injection-molded plastic parts have been sorted out because of defects detected, and wherein the second storing plane is formed either directly by the final package units or by a stationary or adjustable horizontal intermediate storage and the inspected subgroups are movable from the intermediate storage into the final package units by gripper means.

2. The packaging device according to claim 1, wherein an optical axis of the at least one digital camera of the inspection device is disposed at an angle perpendicular to a vertical axis of the inspection device, the vertical axis running through an inspection position for the injection-molded plastic parts which is located on an inspection track.

3. The packaging device according to claim 2, wherein the transfer means conveys the S sub-subgroups through the lateral inspection device along the inspection track, and the transfer means comprise a first and a second work piece support each serving to receive one of the S sub-subgroups, the work piece supports being configured to be moved back and forth along a transfer axis between respective loading positions, in which they are loaded with one of the S sub-subgroups, and respective unloading positions, from which the respective sub-subgroups are transferred into the second storing plane after optical inspection.

4. The packaging device according to claim 3,
   wherein moving means are assigned to at least one of the work piece supports, the moving means being configured to move at least one of the work piece supports relative to the transfer axis in such a manner that the work piece supports can be moved past each other without collision in the inspection device while one of the work piece supports is located on the inspection track.

5. The packaging device according to claim 4,
   wherein the transfer means are configured to move the work piece supports back and forth between the respective loading and unloading positions in an electronically or mechanically coupled movement.

6. The packaging device according to claim 3,
   wherein the work piece supports have lateral openings for receiving the injection-molded plastic parts of a sub-subgroup, the openings being disposed in such a manner that they are traversed by the optical axis of the at least one digital camera when the work piece supports are transported past each other in the lateral inspection device.

7. The packaging device of claim 6, wherein the at least one digital camera comprises multiple digital cameras and wherein the openings are disposed in such a manner that they are traversed by multiple optical axes of the multiple cameras spaced apart in the circumferential direction.

8. The packaging device according to claim 1, wherein the at least one digital camera comprises multiple digital cameras spaced apart in a circumferential direction, and wherein the optical lateral inspection is for shape and/or surface defects.

9. An injection molding system comprising an injection molding device configured to produce pipette tips or medical reaction vessels, with a number K cavities, which are distributed evenly over a number C clusters, and the packaging device according to claim 1.

10. A packaging method for packaging injection-molded plastic parts in final package units, the injection-molded plastic parts being pipette tips or medical reaction vessels and each having a longitudinal center axis, which extends centrally through an opening, the method comprising the steps of:
   providing a packaging device according to claim 1,
   simultaneously removing multiple shots of the number K of injection molded plastic parts from the number K of respective cavities,
   evenly distributing the number K of injection-molded plastic parts in the cavity-pure manner over the number U of cavity-pure subgroups in the first storing plane, filling up the final package units in the cavity-pure or cavity-sorted manner until the final package units each contain the maximum number A of injection-molded plastic parts, subjecting the injection-molded plastic parts of the subgroups to the optical lateral inspection in the lateral inspection device, which comprises the at least one digital camera, before the final packages are filled up, and wherein the subgroups are each divided into the S sub subgroups of injection-molded plastic parts disposed one behind the other and the S sub-subgroups are transported through the lateral inspection device one after the other by means of the transfer means and are subjected to the lateral inspection, and arranging the S sub-subgroups in the inspected cavity-pure subgroups in the second storing plane after having passed through the lateral inspection device, and the second storing plane being formed either directly by the final package units or by the stationary or adjustable intermediate storage and the inspected subgroups being moved from the intermediate storage into the final package units.

11. The packaging method according to claim 10, wherein the sub-subgroups are transported through the lateral inspection device along an inspection track by means of the transfer means in such a manner that an optical axis of the at least one camera intersect(s), perpendicularly, the longitudinal center axis of one of the injection-molded plastic parts in an inspection position located on the inspection track.

12. The packaging method according to claim 10, wherein the transfer means comprise a first and a second work piece support each serving to receive one of the S sub-subgroups, the work piece supports being moved back and forth along a transfer axis between respective loading positions, in which they are loaded with one of the S sub-subgroups, and respective unloading positions, from which the respective S sub-subgroups are transferred into the second storing plane after optical inspection, and wherein the first and the second work piece support are conveyed through the lateral inspection device along a shared inspection track with one of the S sub-subgroups while being transferred from the respective loading positions to the respective unloading positions.

13. The packaging method according to claim 12, wherein the transfer means, which comprise a belt drive, move the work piece supports back and forth between the respective loading and unloading positions in an electronically or mechanically coupled movement.

14. The packaging method according to claim 12, wherein at least one of the work piece supports is moved relative to the transfer axis by means of moving means in such a manner that the work piece supports are moved past each other in the lateral inspection device while one work piece support of the work piece supports which is filled with one of the S sub-subgroups is located on the inspection track.

15. The packaging method according to claim 12, wherein the work piece supports each have a lateral opening into which the injection-molded plastic parts of a sub-subgroup disposed in the work piece support protrude, the injection-molded plastic parts vertically extending through the lateral opening, and the work piece supports are optically inspected by the at least one digital camera through the lateral opening.

16. The packaging method according to claim 15, wherein at least one camera of the lateral inspection device is disposed in such a manner that the injection-molded plastic parts in the first work piece support are optically inspected through the lateral opening of the second work piece support and/or in such a manner that the injection-molded plastic parts in the second work piece support are optically inspected through the lateral opening of the first work piece support.

17. The packaging method according to claim 10, wherein injection-molded plastic parts with defects detected during the optical inspection are sorted out and replaced with non-defective injection-molded plastic parts from the same cavity or a subgroup with a defective injection-molded plastic part is sorted out entirely.

18. The packaging method of claim 10, wherein the number K of cavities are distributed evenly over the number C of clusters, and wherein the evenly distributing step is carried out until each subgroup contains the number L of injection-molded plastic parts, the number L of the injection-molded plastic parts of one subgroup corresponding to the maximum number A of injection-molded plastic parts that can be contained in one final package unit or to an integer divisor of A.

19. The packaging method of claim 10, wherein the optical lateral inspection is for shape and/or surface defects, wherein the at least one digital camera comprises multiple digital cameras spaced apart in a circumferential direction.

20. The packaging method of claim 10, wherein composition of the inspected cavity-pure subgroups corresponds to the composition of the subgroups of the first storing plane in the event that no individual injection-molded plastic parts have been sorted out because of defects detected.

* * * * *